(12) United States Patent  (10) Patent No.: US 7,809,126 B2
Marascio et al.  (45) Date of Patent: Oct. 5, 2010

(54) PROXY SERVER FOR INTERNET TELEPHONY

(75) Inventors: Louis R. Marascio, Austin, TX (US); Adam Chaney, Austin, TX (US); Paul Long, Spicewood, TX (US); James Dixson, Austin, TX (US); Robert Scott Comer, Austin, TX (US)

(73) Assignee: Cisco Technology, Inc., San Jose, CA (US)

( * ) Notice: Subject to any disclaimer, the term of this patent is extended or adjusted under 35 U.S.C. 154(b) by 1251 days.

(21) Appl. No.: 11/368,171

(22) Filed: Mar. 3, 2006

(65) Prior Publication Data

US 2006/0262916 A1  Nov. 23, 2006

Related U.S. Application Data

(63) Continuation-in-part of application No. 11/133,407, filed on May 19, 2005.

(51) Int. Cl.
 *H04M 7/00* (2006.01)
(52) U.S. Cl. .................. 379/221.08; 709/222; 709/238; 709/202; 370/432
(58) Field of Classification Search ............ 379/221.08; 709/222, 238, 202; 370/432
 See application file for complete search history.

(56) References Cited

U.S. PATENT DOCUMENTS

| | | | |
|---|---|---|---|
| 6,373,817 B1 | 4/2002 | Kung et al. | |
| 6,538,656 B1 | 3/2003 | Cheung et al. | |
| 6,571,212 B1 | 5/2003 | Dent | |
| 6,584,490 B1 * | 6/2003 | Schuster et al. | ............. 709/200 |
| 6,604,139 B1 | 8/2003 | Sajina et al. | |
| 6,647,020 B1 | 11/2003 | Maher et al. | |
| 6,681,252 B1 * | 1/2004 | Schuster et al. | ............. 709/227 |
| 6,888,803 B1 | 5/2005 | Gentry et al. | |
| 2002/0186685 A1 | 12/2002 | O'Brien, et al. | |
| 2003/0005043 A1 | 1/2003 | Hsu | |
| 2003/0093563 A1 | 5/2003 | Young et al. | |
| 2003/0123432 A1 | 7/2003 | Cheng et al. | |
| 2003/0228005 A1 | 12/2003 | Melick et al. | |
| 2004/0150712 A1 | 8/2004 | Le Pennec | |
| 2005/0078170 A1 | 4/2005 | Firestone et al. | |
| 2006/0013201 A1 | 1/2006 | Bettis et al. | |
| 2006/0101159 A1 | 5/2006 | Yeh et al. | |
| 2006/0199597 A1 | 9/2006 | Wright | |

* cited by examiner

*Primary Examiner*—Quynh H Nguyen
(74) *Attorney, Agent, or Firm*—Trellis IP Law Group, PC

(57) ABSTRACT

An apparatus and a method are provided for proxying communications between devices on an IP telephony network. In a preferred embodiment, an appliance comprising a network server and proxy server software includes filtering rules which can be modified to enable proxied communication between an IP phone on a first data network, such as, for example, the internet, and a call processing server located on a second data network. In another embodiment, an appliance comprises a proxy server that proxies call-processing and signaling communications between an authenticated IP phone on a first data network and a call processing server located on a second data network. In another embodiment, the appliance relays voice traffic between IP phones. In another embodiment, the proxy server software operates in a secure mode to permit encryption and decryption of voice and control communications. In another embodiment, the proxy server enables proxied communications between a call processing server and an IP phone by modifying the provisioning data exchanged between the call processing server and the IP phone.

20 Claims, 4 Drawing Sheets

PROXY SERVER FOR INTERNET TELEPHONY

RELATED APPLICATIONS

The present application is a continuation-in-part of U.S. patent application Ser. No. 11/133,407, filed May 19, 2005, pending. U.S. patent application Ser. No. 11/133,407 is incorporated by reference herein.

FIELD

The present invention relates to an improved apparatus and method for internet protocol (IP) telephony.

BACKGROUND

The gradual adoption of Voice over Internet Protocol (VoIP) technologies in recent years has helped reduce networking costs while bridging voice and data networks. A VoIP-enabled telephone (IP phone) can communicate with other IP phones over a data network also used for transmission of data by computers. In a common embodiment, administrative tasks associated with IP telephony such as provisioning the IP phones on the network and setting up and tearing down calls are handled by a call processing server (sometimes referred to as an IP PBX) that communicates with the IP phones over the same data network.

Although often the IP phones and associated call processing server are co-located on a secure private data network, it is sometimes the case that one or more IP phones are located on an untrusted data network such as the internet. This configuration requires connecting the call processing server directly or indirectly to the untrusted data network.

It is well-known that directly connecting a server to an untrusted data network such as the internet exposes the server to unauthorized intrusion and attacks from the untrusted data network, such as, for example, denial of service attacks, man-in-the-middle attacks, theft of service, and/or Trojan horses or malware. These security concerns are magnified for call processing servers in an IP telephony environment. Because the call processing server handles all call processing requests, any form of attack that can disable or disrupt a call processing server can jeopardize the entire IP telephony network. An unauthorized intruder, moreover, could use unauthorized access to the call processing server to eavesdrop on the phone calls of authorized users or to make unauthorized phone calls.

A firewall can shield servers and other network devices from intruders and attacks. A firewall is a system or combination of systems, implemented in hardware and/or software, that enforce a boundary between a trusted data network and an untrusted data network. The untrusted network could be a first data network such as the internet. It could also be part of a private data network (such as a LAN) where it is desired to protect sensitive components against internal attacks such as those from disgruntled employees. A network-level firewall, often called a packet filter, can filter traffic at the network protocol packet level, allowing or denying access to incoming packets based on the source address, destination address, and ports of the packet. An application-level firewall can route or filter incoming traffic at the application level, sometimes intelligently routing payload based on protocols such as HTTP. Many firewalls also rely on network address translation (NAT), wherein the firewall converts internal network addresses on the trusted network, otherwise invisible externally, to public addresses directly accessible on the untrusted network, and vice versa, and routes communications accordingly.

A conventional firewall, however, does not optimally protect the call processing servers in a typical IP telephony environment. If the firewall is to act as a packet filter, the amount of access the firewall will be required to provide to the untrusted data network to permit proper functioning of the call processing server leaves the call processing server too exposed to malicious attacks; and filtering at the application level introduces a substantial, potentially excessive, amount of latency (delay) into the processing of packets containing call control information and/or voice traffic. What is needed, then, is an appliance that can shield call processing servers without the deficiencies of a conventional firewall.

A virtual private network (VPN) is a known solution to the security problems created by using untrusted data networks such as the internet for transmission of IP telephony communications. A VPN allows secure communication from one trusted network to another trusted network where part of the path traverses an untrusted network, and it can does so through a combination of authentication of user identification, encryption of call processing and/or voice payload, and tunneling, i.e. embedding the encrypted packets in an IP packet for transmission with TCP/IP. A VPN typically carries other types of data in addition to IP Telephony traffic, however, and the additional latency added by the VPN and the cost and complexity of licensing, configuration, support, and maintenance make a VPN less than optimal for IP telephony applications.

What is needed, then, is an appliance that will provide some or all of the security advantages of a VPN without the additional cost, complexity and overhead associated with a VPN.

SUMMARY

An apparatus and a method are provided for proxying communications between devices on an IP telephony network. In a preferred embodiment, an appliance comprising a network server and proxy server includes filtering rules which can be modified to enable proxied communication between an IP phone on a first data network, such as, for example, the internet, and a call processing server located on a second data network. In another embodiment, an appliance comprises proxy server that proxies call-processing and signaling communications between an authenticated IP phone on a first data network and a call processing server located on a second data network. In another embodiment, the appliance relays voice traffic between IP phones. In another embodiment, the proxy server software operates in a secure mode to permit encryption and decryption of voice and control communications. In another embodiment, the proxy server enables proxied communications between a call processing server and an IP phone by modifying the provisioning data exchanged between the call processing server and the IP phone.

DETAILED DESCRIPTION OF PREFERRED EMBODIMENTS

Figure 1:
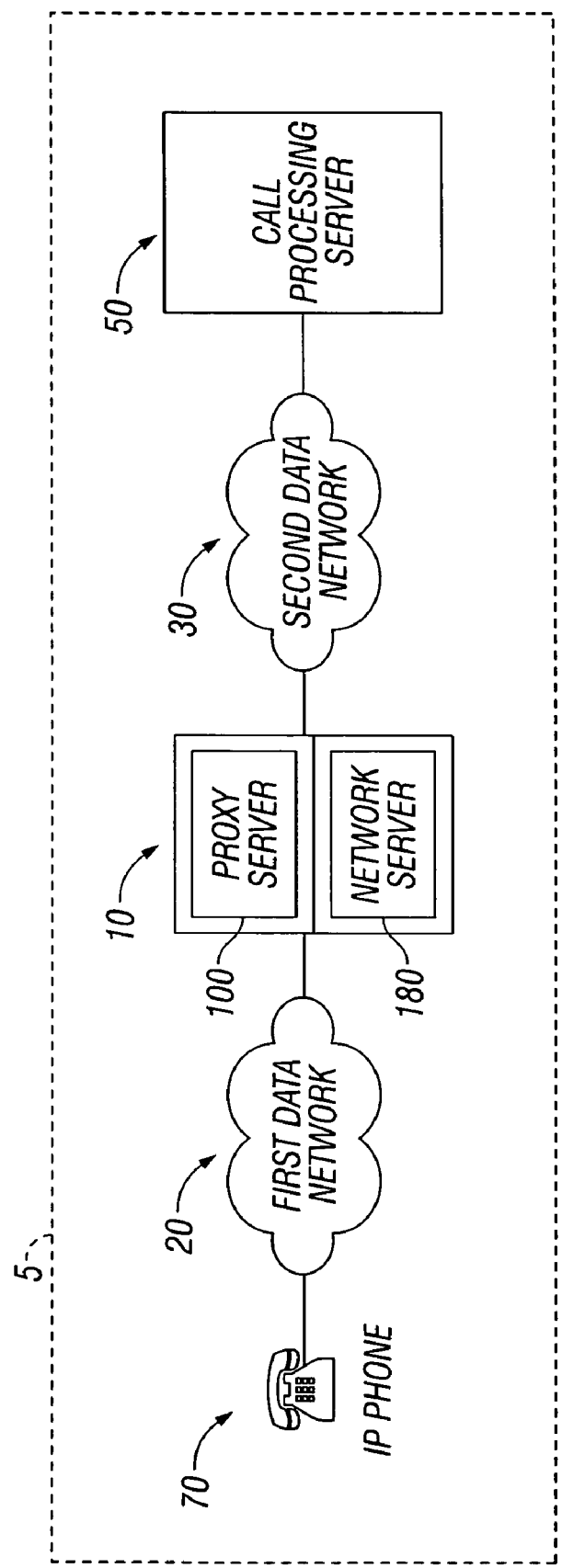
FIG. 1 depicts a high level view of the components of an IP telephony environment according to a preferred embodiment of the present invention.

FIG. 1 depicts a high level view of the components of an IP telephony environment 5 according to a preferred embodiment of the present invention.

IP telephony environment 5, in a preferred embodiment of the present invention, includes one or more devices such as, for example, IP phones 70 which communicate via a first data network 20 with an appliance 10 which is connected via a second data network 30 to one or more call processing servers 50.

An appliance preferably could be a computer which is optimized for specific tasks such as, for example, a firewall to protect computers on the network from malicious attacks from the internet, or traffic management devices, such as routers. The task-related optimization may be accomplished through selection of hardware, special-purpose software, or a combination of hardware and software. An appliance may be fully capable of uses and applications other than the specific function for which is has been optimized, however.

In a preferred embodiment of the present invention, appliance 10 comprises a network server and a proxy server. A proxy server preferably is an intermediate system placed topologically between two classes of network entities through which entities of one class communicate with entities of the other using the same protocol. The classes may be different, as in a client class and a server class, or they may be the same, as in a class of peer-to-peer entities. The typical proxy server is transparent—it appears to members of a class as if it is a member of the other class. A proxy server can provide various services by, for example, selectively modifying and (less often) augmenting or removing information in data streams passing through it between entities of the two classes. A proxy server can provide additional services by simply relaying information without alteration. The proxy server preferably retains the essential semantics of the data streams.

Appliance 10 comprises a network server 180 which, in a preferred embodiment, will be familiar to those of skill in the art, after appreciation of the specification and drawings included herein. In a preferred embodiment, appliance 10 further comprises a proxy server 100 and software which, in a preferred embodiment, may be, for example, the Linux operating system, an Apache web page server, and database software such as postgreSQL. A configuration of proxy server 100 is described in more detail below, in connection with FIG. 2.

An IP phone 70, in a preferred embodiment, is a communications device that is TCP/IP aware, i.e., it is a valid device on an internet protocol (IP) data network, and is capable of transmitting and receiving voice payload, i.e. digitized packets of voice or fax data, among other potential features.

IP telephony requires protocols for call control and signaling (control protocols). Control protocols are used to set up and tear down the connection between two or more devices (including IP phones) in a VoIP network. Control protocols in use in VoIP networks may include, for example, Session Initiation Protocol (SIP), a peer-to-peer protocol such as H.323, and client/server protocols such as Media Gateway Control Protocol (MGCP) and Skinny Client Control Protocol (SCCP, or "Skinny").

Control protocols are to be distinguished from the voice protocols that are used to carry the voice payload (i.e., telephone and fax) in IP telephony. In a preferred embodiment of the invention, voice packets are transported across the IP network by using the Real-Time Transport Protocol (RTP) and RTP Control Protocol (RTCP) stack and by using the User Datagram Protocol (UDP) as a transport layer protocol.

In a preferred embodiment of the present invention, IP phone 70 is a Cisco IP phone adapted to use the SCCP control protocol, such as, for example, Cisco IP phone models 7905, 7912, 7940, 7960, 7936, 7970. In an alternative embodiment, IP phone 70 is a software-based application that runs on a personal computer. An example is the Cisco IP Communicator. Other instances of an IP phone 70 may include a traditional analog phone that is connected either to an IP telephony network via an analog telephone adapter (ATA) or to a voice gateway.

With continuing reference to FIG. 1, IP phone 70 is connected to a first data network 20. First data network 20, in a preferred embodiment of the present invention, is an untrusted public data network such as, for example, the internet. Appliance 10, in a preferred embodiment, is interposed between first data network 20 and second data network 30 by, for example, being connected via an ethernet cable or other cable or physical connection or via a wireless connection. Appliance 10 preferably proxies communications between devices on first data network 20, such as, for example, IP phone 70, and devices on second data network 30, such as, for example, call processing server 50. Second data network 30, in a preferred embodiment, preferably is a Gigabit Ethernet (GigE) local area network (LAN).

Still referring to FIG. 1, call processing server 50 preferably handles call-processing requests involving IP phone 70 in IP telephony environment 5. Call processing server 50 is adapted to communicate over one or more data networks with an IP phone 70 according to one or more control protocols such as H.323, SIP, MGCP, and SCCP. Call processing server 50 preferably is adapted to store or obtain configuration or provisioning data for IP phone 70 and to supply IP phone 70 with configuration or provisioning data within IP telephony environment 5.

IP telephony environment 5 can include one or more call processing servers 50, and a preferred embodiment of the present invention comprises a cluster of up to 8 call processing servers 50 depending on the number of projected devices in the IP telephony network. Additional call processing servers 50 allow for upward scalability to handle additional devices, such as, for example, IP phones.

In a preferred embodiment of the present invention, call processing server 50 may be implemented as a Cisco Media Convergence Server with Cisco CallManager software, version 3.3 or above installed on it. Versions 3.3 and above of the Cisco CallManager software support the SCCP control protocol for processing call requests by an IP phone.

Figure 2:
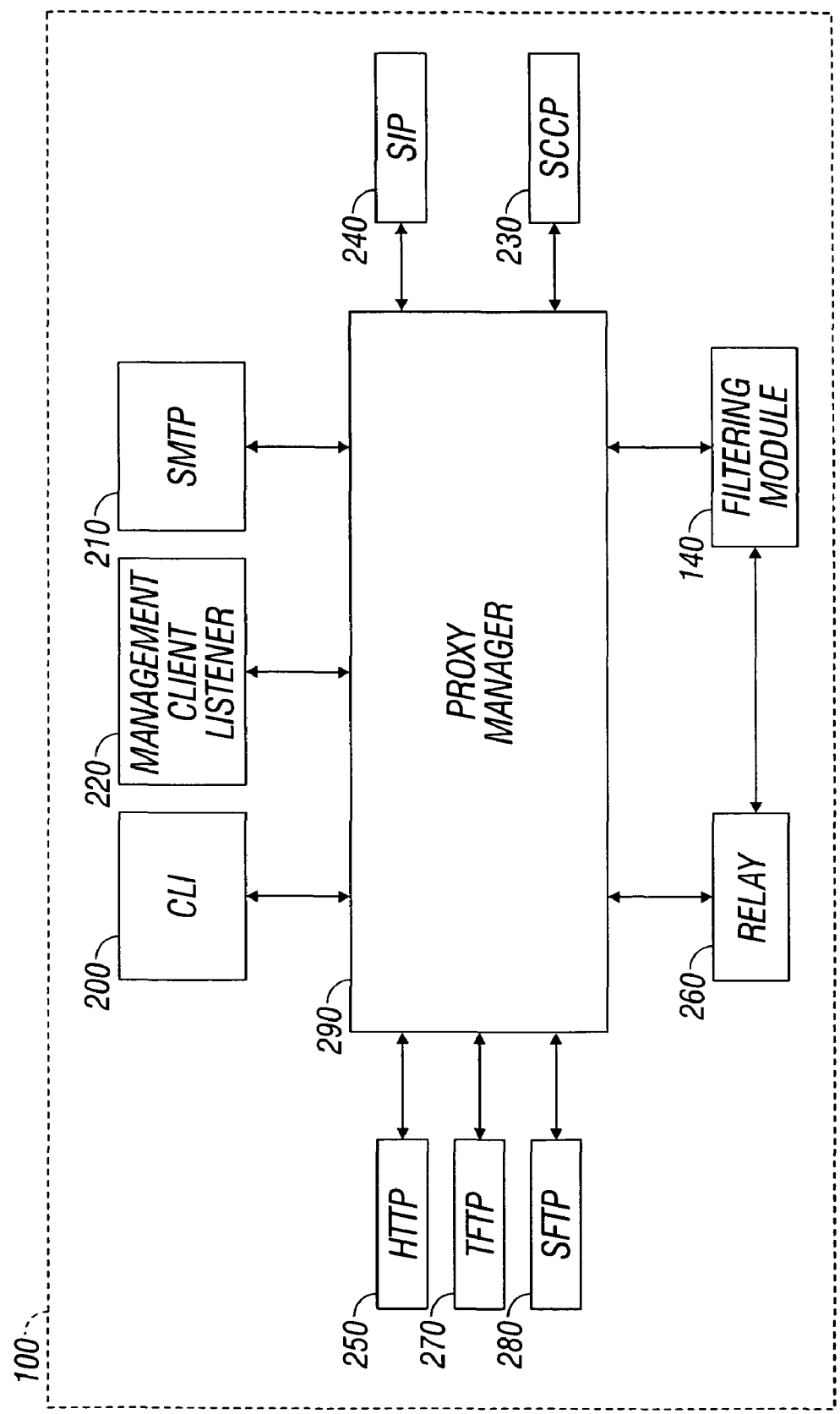
FIG. 2 depicts a block diagram showing a module design of a proxy server component of an appliance according to a preferred embodiment of the present invention.

FIG. 2 depicts a block diagram showing module design of proxy server module 100 of appliance 10 according to a preferred embodiment of the present invention.

Filtering module 140 includes filtering rules, i.e. rules that specify how packets of information received by the appliance from first data network 20 are to be processed, such as, for example, which packets of data are simply dropped, which packets are relayed or forwarded, and the destination address and port. The filtering rules, in a preferred embodiment, can be modified under software control. In a preferred embodiment of the present invention, filtering module 140 may be, for example, the IP Tables/Netfilter modules in Linux, which execute in kernel mode but can be modified by an application operating in user space or kernel space.

Proxy server module 100 in a preferred embodiment includes Proxy manager module 290. In a preferred embodiment, Proxy manager module 290 controls and manages phone signaling proxy modules 230 (SCCP) and 240 (SIP), and using method calls and interprocess communication protocols relays messages and data with other modules, including relay module 260, HTTP module 250, SFTP module 280, TFTP module 270, command line interpreter (CLI) module 200, SMTP module 210, and Management Client listener module 220. Proxy manager module 290 performs additional functions, as described below.

In a preferred embodiment of the present invention, phone signaling proxy modules 230 and 240 receive and process call control and signaling requests from authenticated IP phone 70, such as, for example, requests for activation, registration, and call initiation and tear down. Phone signaling proxy module 230 handles control communications according to the SCCP control protocol; and phone signaling proxy module 240 handles control communications according to the SIP control protocol. In an alternative embodiment of the present invention, proxy server module might include other signaling proxy modules such as, for example, modules for processing MGCP and H.323 control protocols. The Proxy manager model also handles inter-appliance communication through a messaging format.

Relay module 260, in a preferred embodiment, manages RTP relays of voice traffic between IP phones 70 by going into Linux kernel mode and modifying the Linux iptables routing rules so that the Linux kernel relays RTP packets between one IP phone 70 and another IP phone 70. This packet-level approach eliminates RTP packet handling by the appliance at the application level, resulting in more efficient use of system resources and less delay of through traffic, but alternative embodiments are also within the scope of the invention.

IP phone 70 preferably is or can be adapted for communicating via "Trivial File Transfer Protocol" (TFTP). In a preferred embodiment, TFTP module 270 receives and processes requests from IP phone 70 for configuration files. The TFTP module makes a TFTP request for the specified files from the call processing server 50 associated with IP phone 70, adjusting the content as required to perform proxy function. The TFTP server preferably substitutes the appliance's address 12 where it appears in the configuration files returned to IP phone 70, and also associates the call processing server's address with the device name of IP phone 70 to use later to proxy phone requests. The existing information about the phone is augmented with the assigned call processing server 50 and associated proxy address. In a cluster configuration, there are multiple assignments of proxy for a given device, and not all devices have the same assignment. There is preferably only one TFTP server assigned to any one IP phone 70. Hence the TFTP server must notify the other appliance 10 in the cluster of the assigned call manager addresses for a given phone.

HTTP server module 250 receives authentication requests from a user wishing to activate IP phone 70. In a preferred embodiment of the present invention, HTTP server module 250 receives authentication requests via a secure transmission. HTTP server module 250 preferably passes the authentication request to Proxy manager module 290, which request includes the user name and password and the IP address of IP phone 70. In a preferred embodiment, Proxy manager module 290 maintains an internal user list containing user specific data (such as, for example, a user name and a hash of the user's password), against which it compares the user name and password supplied by the user. The IP address is stored with the user-specific data upon successful authentication. In an alternative embodiment, the user contacts another authentication server, which then contacts proxy HTTP server, authenticates itself, and then authorizes the user by name and IP address. If successful, HTTP server module 250 is notified and it confirms authentication to the user. Proxy manager module 290 modifies the Linux iptables access rules so that filtering module 140 opens selected ports for access to other services (proxy, tftp, http) to requests from the address of IP phone 70. HTTP Server module 250 also handles HTTP requests from IP phone 70 for service (initiated by the user pushing the service button on IP phone 70), which it then proxies to the appropriate call processing server 50, possibly updating the content in either direction.

In an alternative embodiment of the present invention, one or more appliances 10 can be clustered together for load management and fail-safe operation (not depicted). In a preferred embodiment with a cluster of appliances 10, each appliance has a unique IP address, which is responsive to requests for call control. Additionally, each appliance is operative to receive HTTP requests and TFTP requests at a common IP address and port number, but only one appliance 10, the active appliance, actually responds. When an appliance in the cluster learns a fact, such as, for example, user authentication data or a new modification to the filtering rules, it broadcasts it to all other appliances in the cluster. In a preferred cluster configuration, the active appliance preferably holds a token indicating that it is the active appliance. The other appliances preferably poll the active appliance regularly to confirm that the "active" appliance has not failed. If the appliance 10 with the "active" token has failed, the other appliances negotiate who will get the token and become the next "active" appliance 290, and thus respond to HTTP and TFTP requests on the common IP address and port.

SMTP module 210 implements a Simple Mail Transfer Protocol. SMTP module preferably sends e-mail to system personnel regarding system status and/or emergency messages and, when enabled allows the user to update the local password database or recover from a forgotten password.

SFTP module 280 preferably is used to retrieve log files, and to deliver configuration files and updates.

Management Client Listener module 220 listens for connections from Management Client 35 and responds to requests for status, reports, and configuration changes. Management Client 35, depicted in FIG. 3, is a Java-enabled client with a full-featured GUI (graphic user interface) for status, reports, and configuration of the system.

CLI module 200 receives and performs simpler requests for status, reports, and configuration changes using a text command line from, preferably, a console 14 connected to appliance 10 via an SSH or direct serial connection. It is primarily used during initial installation, and also perhaps by remote personnel during installation debugging.

Figure 3:
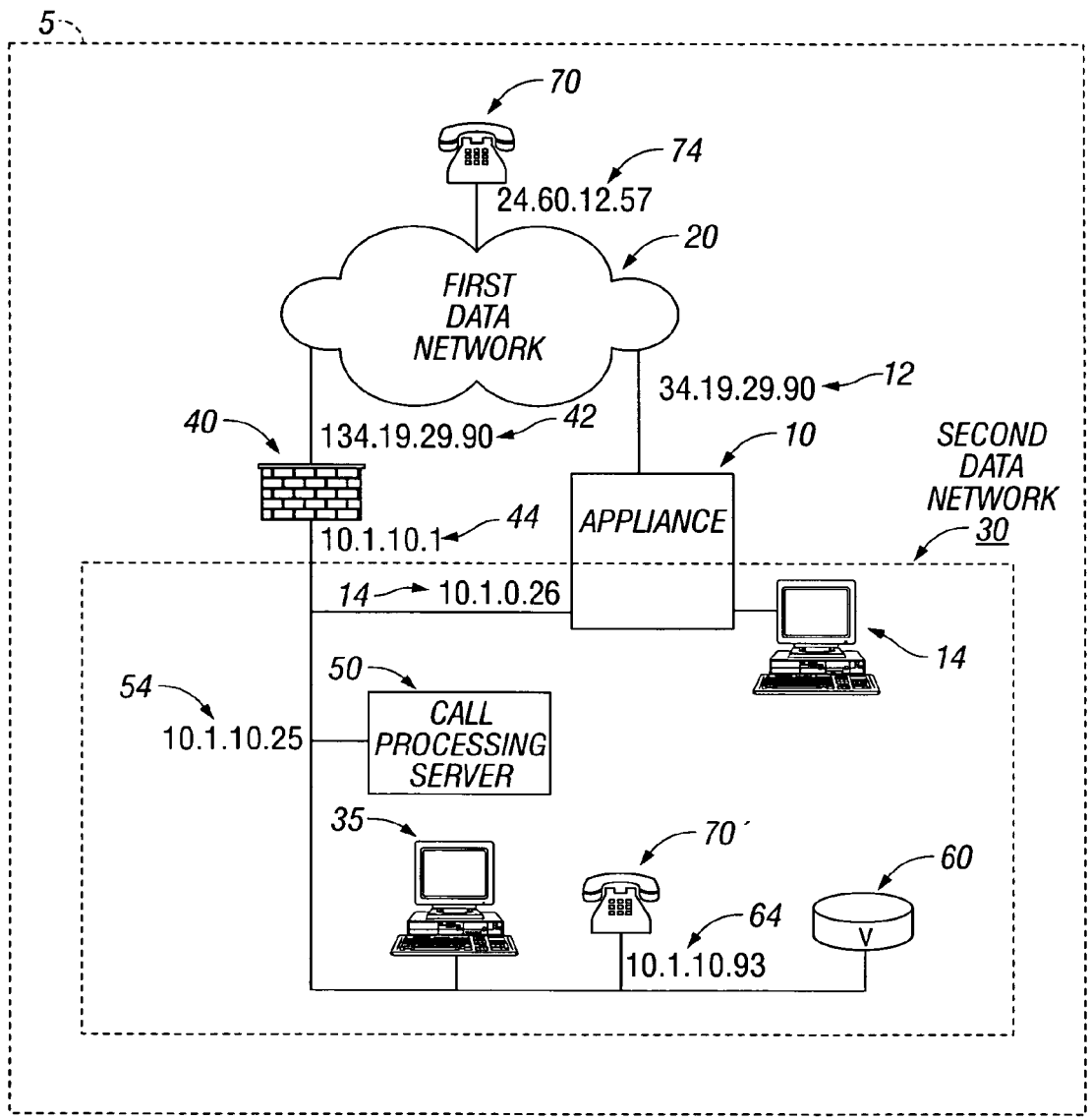
FIG. 3 depicts a more detailed view of the components of an IP telephony environment according to a preferred embodiment of the present invention.

FIG. 3 depicts a more detailed view of the components of an IP telephony environment 5 according to a preferred embodiment of the present invention.

FIG. 3 depicts a preferred embodiment comprising one IP phone 70 connected to first data network 20 with an IP address 74 (24.60.12.57) publicly registered on first data network 20. One of ordinary skill in the art will readily appreciate, in light of the specification and drawings herein, that IP phone 70 could be connected directly to the first data network 20 or, in an alternative embodiment, could be connected indirectly via, for example, a user local area network (user LAN) in which IP phone 70 is shielded from first data network 20 by a NAT/firewall (not depicted). In such an alternative embodiment, the IP phone 70 might not necessarily have an IP address publicly registered on first data network 20 but the NAT/Firewall on the user LAN would have such a public address on first data network 20, and the NAT Firewall preferably would be responsible for NAT and routing VoIP traffic to IP phone 70 in a manner transparent to appliance 10 and call manager 50.

All IP addresses described herein, it will be understood, are solely for purposes of demonstrating the relationship between the various components of a preferred embodiment of the present invention, and may take different values in other embodiments.

FIG. 3 depicts one call processing server 50 connected to second data network 30 with unique IP address 54 (10.1.10.25). In a preferred embodiment of the present invention, up to eight (8) call processing servers can be clustered together, each with its own unique IP address (not depicted), on second data network 30.

In a preferred embodiment of the present invention, second data network 30 also includes a conventional NAT/Firewall 40 to shield the call processing servers 50 and other devices on the second data network 30 from intruders or other potentially harmful traffic coming from first data network 20. NAT/Firewall 40 has an external IP address 42 (134.19.29.89) registered on the first data network 20, and an internal IP address 44 (10.1.10.1) registered on the second data network 30.

A preferred embodiment of the present invention may include one or more instances of IP phone 70, depicted on FIG. 3 as 70', connected to second data network 30 at address 64 (10.1.10.93). In a preferred embodiment of the present invention, second data network 30 may also include other devices commonly found on LANs or IP telephony networks, such as, for example, routers or servers (not depicted), voice gateways to the packet-switched telephone network 60, and/or Java-enabled Management Client 35. Additional IP phones 70 may comprise analog phones connected to the voice gateway.

In another preferred embodiment of the present invention, NAT/firewall 40 is intended to shield call processing server from potentially harmful internal traffic such as, for example, from disgruntled employees on a corporate LAN. In this alternative embodiment, the first data network is not a public data network (such as the internet) but a private network.

Appliance 10 preferably displays an external IP address 12 to first data network 20, and appliance 10 displays an internal IP address 14 to second data network 30. For purposes of illustration, the external IP address 12 depicted in FIG. 3 for appliance 10 is 134.19.29.90, and the internal IP address 14 depicted in FIG. 3 for appliance 10 is 10.1.0.26. A preferred embodiment of the present invention comprise one or more appliances 10 interposed between second data network 30 and first data network 20, each of said appliance having a unique external IP address on first data network 20 (not depicted) and a unique internal IP address on second data network 30 (not depicted).

In a preferred embodiment, filtering module 140 may be configured to filter IP telephony traffic between the first data network to and from call processing server 50, as depicted in FIG. 3, thereby shielding call processing server 50 on second data network 30; and NAT/firewall 40 (as depicted in FIG. 3) is configured to filter other types of traffic for other applications on second data network 30.

Following are descriptions of exemplary processes involved in authenticating, activating, provisioning, and registering a phone according to a preferred embodiment of the present invention.

Initial state: In the preferred embodiment of the present invention the filtering rules in Filtering Module 140 are initially configured to not accept any request for access to Appliance 10 or call processing server 50 except for an HYMP request in secure mode (HTTPS) to TCP port 443 at the appliance's external IP address 12. Requests that are not accepted are preferably ignored.

Step 1 (Authentication): A user desiring access to the system to activate an IP phone connected to first data network 20, having been duly authorized by the system administrator, preferably may connect with a standard web browser to HTTPS using TCP port 443 and authenticate the device using an agreed-upon name and password. The authentication process will provide IP address 74 of IP phone 70 to Appliance 10.

Step 2 (Activation): If the authentication process is successful, HTTP module 250 preferably modifies the filtering rules in filtering module 140 to accept communications, data transmissions, messages, and/or service requests from IP address 74 of IP phone 70 to specific ports in Appliance 10, such as, for example, (SCCP port, TCP 2000; HTTP port, TCP 80; TFTP port, UDP 69, plus additional ports, dynamically allocated. By setting a timer and then sending a subsequent message to close the ports, HTTP module 250 in a preferred embodiment of the present invention can hold these ports open for a period of time, typically 8-12 hrs, or perhaps until a fixed time such as midnight.

Step 3 (Provisioning): With respect to an embodiment that includes a provisioning function, the following steps are associated with a preferred embodiment of the present invention:

a. IP phone 70 preferably initiates a TFTP request from IP address 74 by sending a message to UDP port 69 and issuing requests for phone firmware and configuration files. IP phone 70 has a unique Station ID (SID) preferably associated with the unique name of the user who authenticated the IP address of the registration request. One request is for an XML configuration file named <SID>.cnf.xml.

b. The TFTP module 270 preferably makes a TFTP request, using the internal IP address of Appliance 10, IP address 14 as the return address in the request packet of IP phone 70 and passes the request and SID number to call processing server 50 at internal IP address 54. Call processing server now believes that the IP address of IP phone 70 is the internal address of Appliance 10, IP address 14.

c. Call processing server 50 preferably returns phone and firmware provisioning data in the form of XML files, including one entitled <SID>.cnf.xml, to TFTP module 270 at IP address 14.

d. The XML file <SID>.cnf.xml preferably includes a variable named processNodeName value which call processing server 50 had initialized with its IP address 54. In an embodiment with more than one call processing server, call processing server 50 does not necessarily return its IP address 54, but might return the IP address of another call processing server 50' as the call processing server to be associated with IP phone 70 for purposes such as load allocation, redundancy, or geographic efficiency. For purposes of this explanation, call processing server 50 is the call processing server associated with IP phone 70.

e. TFTP module 270 preferably stores the SID of IP phone 70, IP address 74, and the initial values of processNode- Name as the IP address of the call processing server associated with IP phone 70.
f. TFTP module 270 preferably changes processNodeName value in <SID>.cnf.xml to appliance 10's external IP address 12 for SCCP port TCP 2000, thereby making IP phone 70 believe that appliance 10 is the call processing server for IP phone 70.
g. The XML file <SID>.cnf.xml includes a variable named proxyserverURL which may be blank when it is first received from call processing server 50. TFTP module 270 preferably changes proxyserverURL in <SID>.cnf.xml to reference port 80 (i.e. the HTTP port) at IP address 12, thereby designating appliance 10 as the default HTTP server for IP phone 70.
h. TFTP module 270 preferably then returns the modified XML file via TFTP to IP phone 70 at IP address 74.

Step 4: (Registration): Now that IP phone 70's firmware is updated and the phone is configured, it preferably connects to Appliance 10, port TCP 2000 and sends an SCCP registration request using its SID and IP address. Proxy manager module 290 determines that call processing server 50 at IP address 54 is the call processing server associated with the SID and the return address of the phone, IP address 74, in the SCCP request. Proxy manager module 290 replaces the return address of the SCCP request with internal address 14 and forwards the SCCP request to the SCCP port at call processing server 50 at address 54. Whatever response the call processing server returns is forwarded to IP phone 70 at IP address 74.

Step 5: (Registered phone): Assuming successful registration, IP phone 70 preferably holds the connection open as long as it is able, sending and receiving various messages as it likes. Appliance 10 holds the corresponding connection to call processing server 50 open, too. Appliance 10 generally forwards all messages from IP phone 70 to call processing server 50, and all messages from call processing server 50 to IP phone 70. When Appliance 10 receives notification that the connection to IP phone 70 or call processing server 50 is broken, it breaks the other connection.

Following is a description of a preferred embodiment of a process of setting up an RTP relay to transmit voice traffic between IP phone 70 and, for explanation purposes, IP phone 70' at IP address 64. Preferably, IP phone 70' could be any instance of IP phone 70 with a SID and IP address distinct from IP phone 70:
a. If IP phone 70 phone makes or receives a call, certain messages exchanged between call processing server 50 and IP phone 70 via Appliance 10 must be monitored and/or updated. In the context of a preferred embodiment using SCCP, the messages may include OpenReceiveChannel, OpenReceiveChannelAck, CloseReceiveChannel, StartMediaTransmission, and StopMediaTransmission.
b. Call processing server 50 preferably sends OpenReceiveChannel to IP phone 70 at the address of appliance 10, IP address 14, indicating that IP phone 70' at IP address 64 is attempting to initiate a call.
c. Relay module 260 preferably allocates two RTP relay ports, one, facing first data network 20 at external IP address 12 and designated port 24970 for purposes of illustration (IP address 12: Port 24970); and the other, facing second data network 30 at internal IP address 14 and designated port 24972 for purposes of illustration (IP Address 14: Port 24972).
d. IP phone 70 preferably returns OpenReceiveChannelAck to IP address 12, reporting that it will receive RTP packets at port 20000 at some IP address (for illustration only). Relay Module 260 intercepts the message, extracts the port information ((i.e., port 20000) of IP phone 70's RTP receive channel from the message, substitutes IP address 14:Port 24972 in its place, and forwards the message on to Call processing server 50.
e. Relay Module 260 preferably adjusts the filtering rules so that RTP packets that arrive at internal IP port 14:Port 24972 are relayed to Port 20000 at the public IP address of IP phone 70 where they appear to come from external port 12:port 24970.
f. Call processing server 50 might send StartMediaTransmission to the IP phone 70 at internal address 14, reporting that IP phone 70 should send RTP packets to internal IP address 64: port 28298. Relay Module 260 preferably intercepts the message, extracts the address and port of the other phone's RTP receive channel (internal IP address 64: port 28298) from the message, substitutes external IP port 12: Port 24970 in its place, and forwards the message on to the phone at IP address 74.
g. Relay Module 260 preferably modifies the filtering rules in filtering module 140 to forward RTP traffic arriving on external IP address 12:port 24970 to internal IP address 64: port 28298, where it will appear to come from internal IP address 12: 24972.
h. Call processing server 50 sends StopMediaTransmission when the call is hung up or put on hold, which undoes the effect of step h. The message is forwarded to IP phone 70 unmodified.
  i. When the phone call is hung up or put on hold, Call processing server 50 preferably will send other messages to IP phone 70:
  ii. Call processing server 50 sends CloseReceiveChannel when the call is hung up or put on hold, which undoes the effect of steps b through h. The message is forwarded to the phone unmodified.

Figure 4:
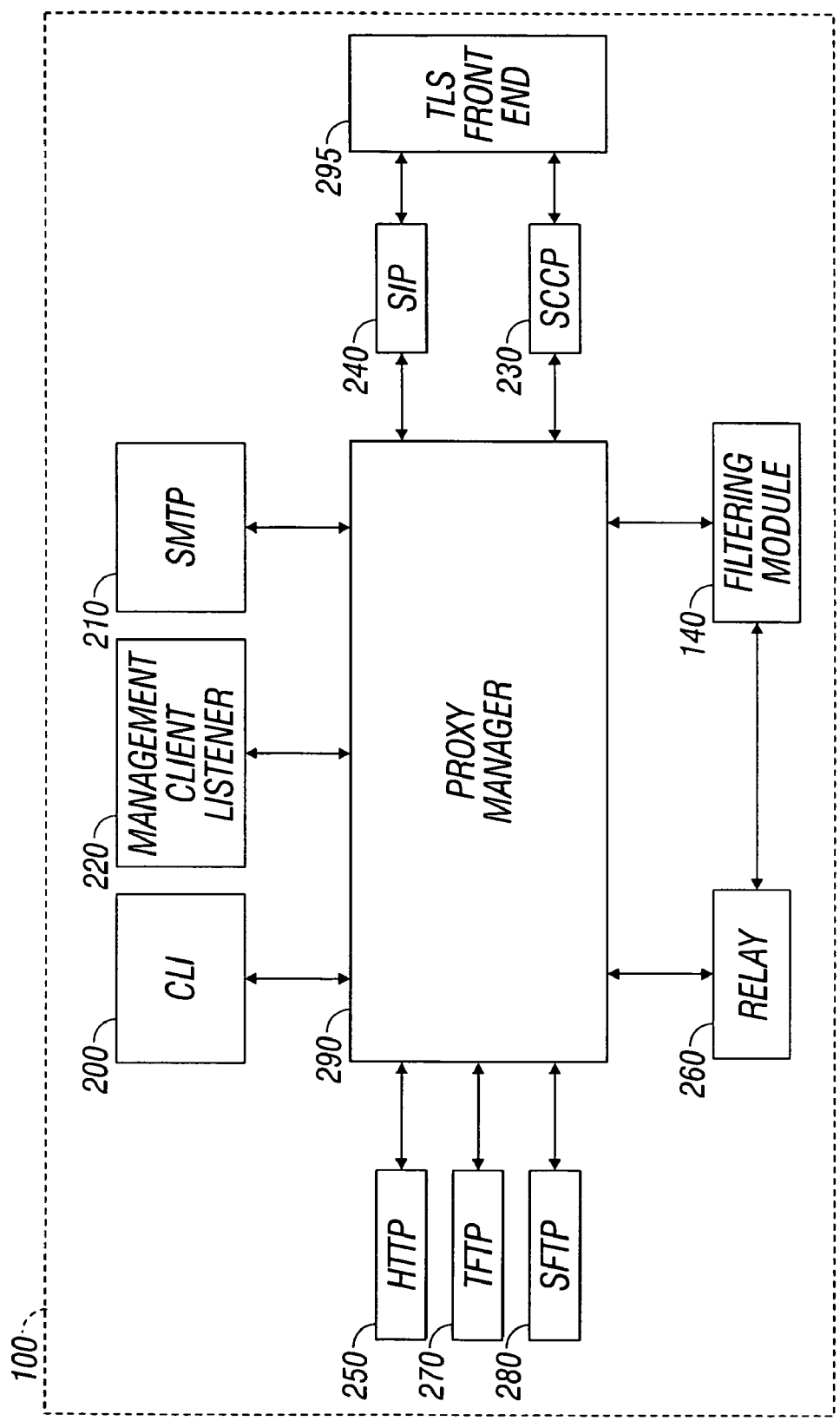
FIG. 4 depicts a block diagram showing an alternative embodiment of a module design of a proxy server component of an appliance according to a preferred embodiment of the present invention.

In an alternative embodiment, proxy server 100 is adapted to operate in secure mode. FIG. 4 depicts a block diagram showing how the appliance would operate in secure mode according to a preferred embodiment of the present invention. TLS Front End 295 handles encryption and decryption of the call control and signaling traffic in secure mode.

In a preferred embodiment, the proxy manager's secure mode is triggered by a TFTP request from IP phone 70 for a Certificate Trust List file. IP phone, in this embodiment, is adapted to operate in a secure environment by including, for example, software to implement encryption of payload data. Proxy Manager 100 generates a Certificate Trust list file according to a preordained pattern, and inserts a "signature" in the appropriate field with a private key, which it obtains in one embodiment from an e-token, and returns the file to IP phone 70. The private key may be, preferably, adapted for use in a private key encryption algorithm with, preferably, at least 128 bit encryption, such as AES 128.

When IP phone 70 sends a provisioning request to Appliance 10, Appliance 10 proxies the request to the appropriate Call Processing Server 50. the provisioning data, in this embodiment, may not contain a signature. The Proxy Manager 100 substitutes into a field in <SID>cnf.sml a "signature" based on a private key and returns it to IP phone 70. IP phone 70 uses the public key to verify the signature. When IP phone 70 registers, it registers to the TLS port 2443 instead of the TCP port 2000.

Regarding SCCP signaling and authentication, SCCP uses transport layer security (TLS) (RFC 2246) for signaling security. Therefore, in secure mode, proxy manager 100 preferably uses the TLS protocol to establish an authenticated and private connection between itself and IP phone 70.

To set up a secure call in a preferred embodiment of the present invention, call processing server 50 sends an OpenReceiveChannel (ORC) message to Appliance 10. Proxy Manager 100 inserts a first AES-128 key for IP phone 70 into the ORC Message to use for decryption and passes the ORC request to IP phone 70. When call processing serve 50 sends a StartMediaTransmission message (SMT), Proxy manager 100 inserts a second AES 128 key, (which could be identical to the first AES 128 key), which IP phone 70 will use for encryption into the SMT message and proxies it to IP phone 70. The relay settings are modified so that RTP packets from IP phone 70 are decrypted using the second AES 128 key before being relayed on to the other phone; and the RTP packets from the other phone towards IP phone 70 are encrypted using the first AES 128 key prior to relaying them to IP phone 70.

Regarding media authentication and encryption, SCCP uses secure real time transport protocol (SRTP)(RFC 3711) for media security. Therefore, in secure mode, Relay Module 260 preferably uses the SRTP protocol in conjunction with a private key encryption algorithm such as, for example, AES 128, to provide packet authentication and privacy of the stream.

Those of skill will recognize that the techniques of the present invention may be implemented to advantage in a variety of sequential orders and that the present invention may be generally implemented in magnetic media such as disks, tapes and CD-ROMs or other storage media for introduction into an IP telephony network. In such cases, instructions for executing the steps of the invention in an IP telephony network will be embedded in the media.

Although many embodiments of the present invention have been described in detail, it will be apparent to those skilled in the art that many embodiments taking a variety of specific forms and reflecting changes, substitutions and alterations can be made without departing from the spirit and scope of the invention. The described embodiments illustrate the scope of the claims but do not restrict the scope of the claims.

The invention claimed is:

1. An apparatus for shielding a call processing server in an IP telephony network, the apparatus comprising:
   a network server interposed between a first data network and a second data network, said first data network being an untrusted network, said second data network comprising said call processing server;
   a proxy server interposed between said first data network and said second data network, said proxy server comprising filtering rules operative to restrict communication from said first data network to said call processing server, wherein said apparatus presents an external IP address to said first data network and an internal IP address to said second data network;
   said proxy server operative to modify said filtering rules to permit proxied communications to said call processing server from a first device on said first data network after said first device is authenticated by said proxy server, wherein said call processing server uses said internal IP address of said apparatus as an IP address of said first device; and
   a transport layer security (TLS) front end coupled to said proxy server to provide encryption and decryption of call control and signaling when said apparatus is in a secure mode of operation.

2. The apparatus of claim 1, wherein said first device comprises an IP phone that is authenticated via an HTTP module of said proxy server.

3. The apparatus of claim 2, wherein said proxy server comprises a plurality of phone signaling proxy modules to process said call control and signaling requests from said authenticated IP phone.

4. The apparatus of claim 1, wherein said proxy server is operative to relay communications between said first device and a second authenticated device using real-time transport protocol (RTP).

5. An apparatus for enabling secure IP telephony, the apparatus comprising:
   a network server interposed between a first data network and a second data network, said first data network being an untrusted network, said second data network comprising a call processing server;
   a proxy server interposed between said first data network and said second data network, said proxy server comprising filtering rules operative to restrict communication from said first data network to said call processing server, wherein said apparatus presents an external IP address to said first data network and an internal IP address to said second data network;
   said proxy server operative to modify said filtering rules to permit proxied communications between said call processing server and a first device on said first data network after said first device is authenticated by said proxy server, wherein said call processing server uses said internal IP address of said apparatus as an IP address of said first device; and
   said proxy server operative to exchange communications with said first device in a secure mode, wherein said secure mode uses secure real-time transport protocol (RTP) and a private key encryption algorithm.

6. The apparatus of claim 5, wherein said private key encryption algorithm comprises at least 128 bit encryption.

7. The apparatus of claim 5, wherein said secure mode uses transport layer security (TLS).

8. An apparatus for shielding a call processing server in an IP telephony networking, the apparatus comprising:
   a network server interposed between a first data network and a second data network, said first data network being an untrusted network comprising an IP phone, said second data network comprising said call processing server; and
   a proxy server interposed with said network server between said first data network and said second data network, said proxy server being operative to proxy a provisioning of said IP phone by said call processing server by modifying provisioning data that is exchanged between said IP phone and said call processing server, wherein said apparatus presents an external IP address to said first data network and an internal IP address to said second data network, said proxy server further comprising a transport layer security (TLS) front end to provide encryption and decryption of call control and signaling when said apparatus is in a secure mode of operation.

9. A method for shielding a call processing server in an IP telephony network, the method comprising the steps of:
   authenticating a first IP phone in a first data network of said IP telephony network, wherein said IP telephony network comprises a network sever and a proxy server that are interposed between said first data network and a second data network, said first data network being an untrusted network, said second data network comprising a call processing server;
   using filtering rules in said network server for restricting communications between said first data network and said second data network;

modifying said filtering rules to enable proxied communications between said authenticated first IP phone and said call processing server; and encrypting and decrypting call control and signaling related to said proxied communications for a secure mode of operation.

10. The method of claim 9, further comprising the step of relaying voice payload data between said authenticated first IP phone and a second IP phone.

11. A method for shielding a call processing server in an IP telephony network, the method comprising the steps of:

proxying a request to said call processing server to provision a first IP phone, wherein said first IP phone is in a first data network and said call processing server is in a second data network, said first data network being an untrusted network;

modifying the provisioning data exchanged between said IP phone and said call processing server using a network server and a proxy server that are interposed between said first data network and said second data network;

proxying communications between said IP phone and said call processing server via said proxy server; and encrypting and decrypting call control and signaling related to said proxied communications for a secure mode of operation.

12. A method for enabling secure communications over an IP telephony network, the method comprising the steps of:

proxying provisioning of an IP phone by a call processing server using a network server and a proxy server that are interposed between a first data network and a second data network, said first data network being an untrusted network comprising said first IP phone, said second data network comprising said call processing server;

supplying a private key to said IP phone with provisioning data from said call processing server for a secure mode of operation; and communicating with said IP phone using secure real-time transport protocol (RTP) and a private key encryption algorithm with said private key.

13. An IP telephony system, comprising:

a network server and a proxy server that are interposed between a first data network and a second data network, said first data network being an untrusted network;

an IP phone connected to said first data network, said IP phone being unauthenticated, wherein said network server and said proxy server present an external IP address to said first data network and an internal IP address to said second data network;

a call processing server connected to said second data network;

said proxy server comprising filtering rules restricting transmission of data from said first data network to said second data network, said proxy server operative to authenticate said first IP phone, and said proxy server operative to modify said filtering rules to enable proxied communication between said authenticated first IP phone and said call processing server; and a transport layer security (TLS) front end coupled to said proxy server to provide encryption and decryption of call control and signaling when said apparatus is in a secure mode of operation.

14. A non-transitory computer-readable storage medium embedded with instructions that operate in an IP telephony environment for execution by a processor, and when executed operable to:

authenticate a first IP phone in a first data network of said IP telephony network, wherein said IP telephony network comprises a network sever and a proxy server that are interposed between said first data network and a second data network, said first data network being an untrusted network, said second data network comprising a call processing server;

use filtering rules in said network server for restricting communications between said first data network and said second data network;

modify said filtering rules to enable proxied transmission of data from said authenticated first IP phone to said call processing server; and encrypt and decrypt call control and signaling related to said proxied transmission of data for a secure mode of operation.

15. An apparatus for shielding a call processing server in an IP telephony network, the apparatus comprising:

means for restricting communications between a first data network and a second data network according to filtering rules, said first data network being untrusted and comprising a first IP phone, said second data network comprising a call processing server, wherein a network server and a proxy server are interposed between said first data network and said second data network;

means for authenticating said first IP phone using said proxy server;

means for modifying said filtering rules to enable proxied communications between said authenticated first IP phone and said call processing server; and means for providing a secure mode of operation for said proxied communications.

16. The apparatus of claim 15, further comprising means for relaying communications between said authenticated first IP phone and a second IP phone.

17. The apparatus of claim 15, further comprising means for communicating with said authenticated first IP phone via said call processing server in said secure mode using encryption and decryption.

18. The apparatus of claim 1, further comprising a cluster of appliances to provide load management and fail-safe operation, wherein each appliance of said cluster presents a unique external IP address to said first data network and a unique internal IP address to said second data network.

19. The apparatus of claim 2, wherein said HTTP module is configured to set a timer and then send a subsequent message to close ports in said apparatus after said ports are opened to receive modifications to said filtering rules.

20. The apparatus of claim 3, wherein said TLS front end is coupled to said phone signaling proxy modules to provide said encryption and decryption of said call control and signaling when said apparatus is in said secure mode of operation.

* * * * *